(No Model.)
R. A. BELDEN.
POWER HAMMER.
No. 403,453. Patented May 14, 1889.
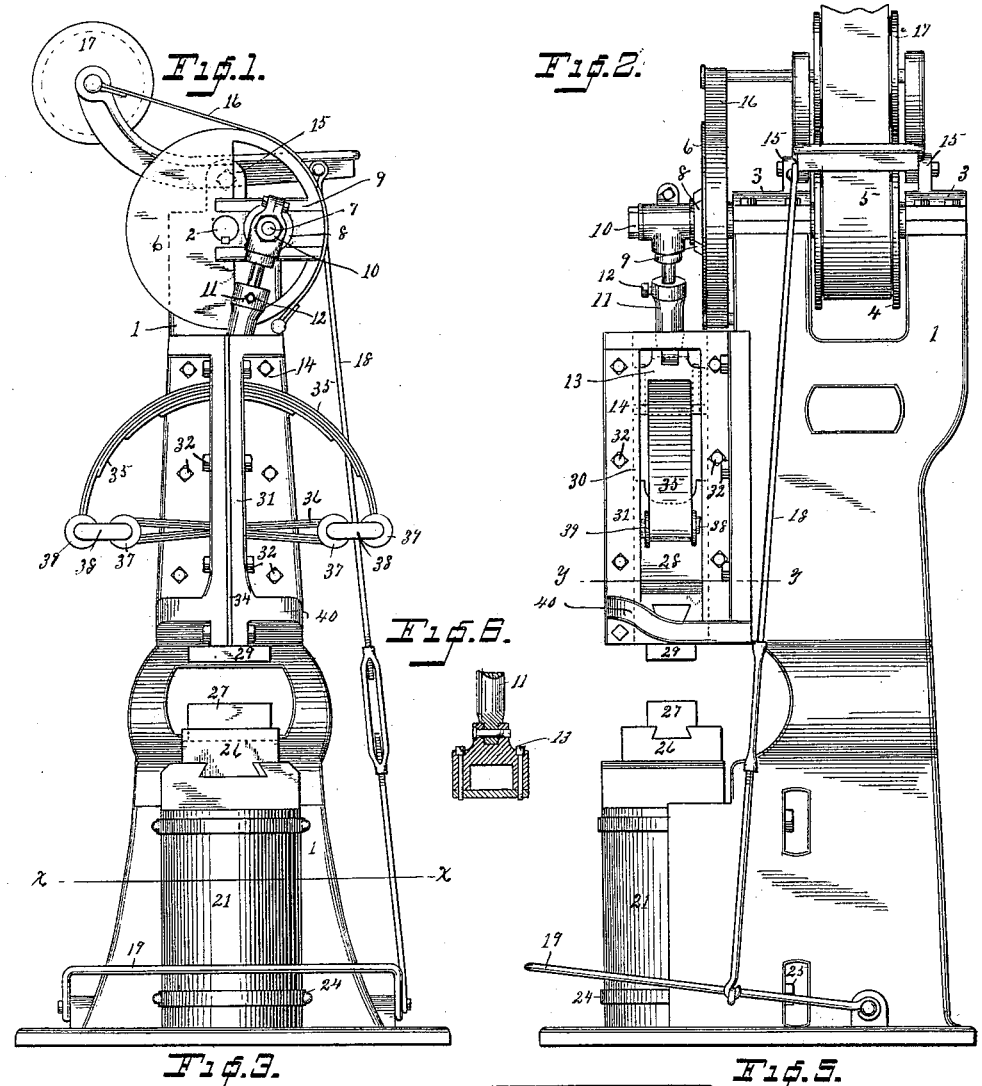
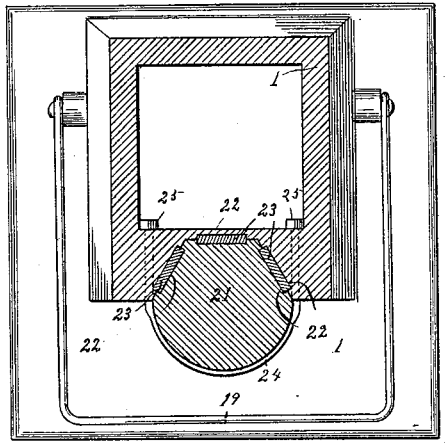
Witnesses
C. M. Newman
Ella J. Pettit
Inventor
Russell A. Belden
By H. M. Wooster
Atty.

UNITED STATES PATENT OFFICE.

RUSSELL A. BELDEN, OF NEW HAVEN, CONNECTICUT.

POWER-HAMMER.

SPECIFICATION forming part of Letters Patent No. 403,453, dated May 14, 1889.

Application filed March 21, 1889. Serial No. 304,115. (No model.)

*To all whom it may concern:*

Be it known that I, RUSSELL A. BELDEN, a citizen of the United States, residing at New Haven, in the county of New Haven and State of Connecticut, have invented certain new and useful Improvements in Power-Hammers; and I do hereby declare the following to be a full, clear, and exact description of the invention, such as will enable others skilled in the art to which it appertains to make and use the same.

My invention relates more especially to upright power-hammers, and has for its general objects to so improve the details of construction as to permit of the machine being run at a high rate of speed without danger of breakage, and to do away with the jar and shock which has heretofore been unavoidable in this class of hammers. With these ends in view I have devised the novel improvements in the details of construction of which the following description, in connection with the accompanying drawings, is a specification, numbers being used to denote the several parts.

Figure 1 is a front elevation, and Fig. 2 is a side elevation, of the hammer complete; Fig. 3, a section on the line *x-x* in Fig. 1; Fig. 4, a section on the line *y y* in Fig. 2; Fig. 5, a detail of the ram detached; and Fig. 6 is a detail sectional view illustrating the attachment of the connecting-rod to the slide.

1 denotes the frame-work of the machine, which may be of any suitable or preferred construction, being preferably cast in a single piece. Power may be applied to operate the ram in any suitable manner.

I will describe the construction which I ordinarily use.

2 is a shaft journaled in boxes 3 at the top of the frame-work, and 4 is a pulley on this shaft, over which a belt, 5, passes. The belt is shown in Fig. 2, but is omitted, for the sake of clearness, in Fig. 1.

6 is a crank-disk upon the shaft, and 7 is a crank-pin fixed to a block, 8, which slides in ways 9 in the face of the disk, being locked at any desired adjustment by a nut, 10, at the outer end of the pin.

11 is a connecting-rod, made in two parts, so as to be readily adjustable by means of a set-screw, 12, one end of said crank-pin being journaled on the crank-disk and the other pivoted to a slide, 13, to which the ram is connected, as will presently be more fully explained.

14 is a frame pivoted to ears 15 upon the top of the frame-work, and 16 is a brake-strap, one end of which is connected to the frame-work below disk 6, said strap passing partially around said disk and being connected to the outer end of frame 14.

17 is an idler-pulley carried by frame 14, over which belt 5 passes. A connecting-rod, 18, extends downward from the rear end of frame 14, and is connected to a foot-treadle, 19, which extends across the front of the machine, the rear ends of said treadle being pivoted to the frame-work, as clearly shown. When the parts are at their normal position, belt 5 passes loosely around pulley 4 and over idler-pulley 17. When it is desired to use the ram, frame 14 is tilted by pressing down upon the treadle. The outer end of said frame carrying the idler is moved upward toward the right, as seen in Fig. 1, which acts to loosen the tension of brake-strap 16 upon disk 6, and at the same time to tighten belt 5, so that rotation is imparted to the shaft to operate the ram.

I have described these parts and their mode of operation, so that the application and operation of my improvements may be clearly understood.

The special object of my invention is to insure an even and regular working of the ram, which I have accomplished by providing guides upon the inner and outer sides, and also to avoid all shock to the frame-work, which I accomplish by making the ram wholly independent of the slide, and also by making the anvil-block wholly independent of the frame-work and placing blocks of wood between the anvil-block and the frame-work, so that the jar of the blows upon the anvil will be taken up by the blocks instead of being transmitted to the frame-work. I am furthermore enabled to greatly increase the speed at which the ram may be operated by providing an independent ram and slide, both working in ways and hinging the connecting rod to the slide.

21 denotes the anvil-block, the lower end of which passes through the bed-plate of the frame-work and is supported in any suitable manner, preferably upon a spile or spiles. The inner side of the anvil-block I preferably make polygonal or hexagonal, as shown in the drawings, and provide mortises 22 in the faces of the anvil-block, and also in the faces of the frame-work corresponding therewith, in which I place blocks 23, preferably of wood. The anvil is held securely in place by metalic straps 24, which pass around said block and into the frame-work, where they are secured by nuts 25 at their inner ends, openings being made in the frame-work in order to give convenient access to said nuts.

26 is the anvil, which is dovetailed to the anvil-block in the ordinary manner, and 27 a lower die, which is dovetailed to the anvil.

28 is the ram, and 29 the upper die carried thereby, which is dovetailed thereto in the usual manner. As already stated, the ram and slide 13, to which connecting-rod 11 is hinged, are wholly separate from each other, both the inner and outer sides of said slide and ram engaging and moving in ways 30, as is clearly shown in Figs. 2 and 4. These ways are formed from two independent castings, which I designate by 31, said castings being secured to each other and to the frame-work by bolts 32, as clearly shown.

In order to give the greatest possible strength, and at the same time avoid great weight in the castings, I cast into each of the parts from which the ways are formed a front and back steel bar, 33, these bars being placed in the molds, and the metal to form the ways being poured around them, and in order to give an elasticity to the parts which it is impossible to secure where metal rests against metal I place between the two castings 31 strips of wood, 34.

As it is important in operation that the upper die should be clearly visible as the blows are delivered, it will be noticed in Figs. 1 and 2 that the lower web of parts 31 is curved upward, as at 40, so as to give the operator an unobstructed view of the work that is being done upon the anvil. The connection between slide 13 and the ram is effected by means of a heavy bow-spring, 35, which is rigidly secured to the slide, ordinarily by a plate and bolts, (see Fig. 6,) its ends curving downward, and a heavy double or triple strap or series of straps, 36, which pass through an opening in the ram, (see Fig. 5,) and are connected to the ends of the spring by means of sleeves 37, around which the straps pass, and links 38, which connect said sleeves with eyes 39 at the lower ends of the spring.

The hinge-connection between the slide, which can only move vertically, and the connecting-rod prevents any oscillatory movement of the devices which connect the ram with the slide. This is an important feature, as it enables the ram to be run at a higher rate of speed than has heretofore been possible. This construction, as a whole, I find in practice to be strong, durable, smooth running, and, furthermore, to prevent the shock of the rapid blows of the ram from being imparted to the frame-work.

Having thus described my invention, I claim—

1. In a power-hammer, the combination, with frame-work and a ram, of an anvil-block wholly independent from the frame-work and made polygonal upon its inner side, corresponding mortises in the face of the frame-work and the anvil-block, blocks of wood in said mortises, and means—for example, metallic straps—whereby the anvil-block is held in position without transmitting the jar of the blows to the frame-work.

2. In a power-hammer, the combination, with the frame-work and ram, of ways cast in two parts, 31, strips of wood between said parts, and bolts connecting said parts to each other and to the frame-work.

3. In a power-hammer, the combination, with the frame-work and ram, of ways cast in two parts, having bars 33 of steel cast therein, strips of wood, 34, between said parts, and bolts securing them together and to the frame-work.

4. In a power-hammer, the combination, with the frame-work and ram, of ways cast in two parts, and strips 34 between said parts, the lower ends of both parts being curved upward, so that the view of the anvil is unobstructed in use.

5. In a power-hammer, the combination, with the ram, a crank-disk, crank-pin, and connecting-rod, of a slide to which the connecting-rod is hinged, a bow-spring carried by the slide, and straps which pass through the ram and are connected to the opposite ends of the spring, so that in use the shock of the blows of the ram is not transmitted to any other part.

6. In a power-hammer, a ram, a slide carrying a bow-spring, and a strap passing through the ram and connected to the ends of the spring.

7. In a power-hammer, a slide carrying a bow-spring, a ram, a strap passing through the ram and connected to the ends of the spring, and inner and outer ways by which the ram and slide are supported.

8. In a power-hammer, a ram, a slide carrying a bow-spring, a connecting-rod hinged to the slide, whereby movement is imparted, and a strap passing through the ram and connected to the ends of the spring.

9. The combination, with a slide carrying a bow-spring, of a ram, a strap connected to the ram and to the opposite ends of the spring, two-part ways in which said slide and ram are guided, and strips 34 between the parts of the ways, as and for the purpose set forth.

10. In a power-hammer, the combination, with an anvil-block polygonal upon its inner side, and frame-work corresponding with said block, of corresponding mortises in said block and frame-work and blocks of wood in said mortises, which take up the shock of the blows of the hammer.

In testimony whereof I affix my signature in presence of two witnesses.

RUSSELL A. BELDEN.

Witnesses:
A. M. WOOSTER,
ETTA F. PETTIT.